United States Patent
Wray

(10) Patent No.: US 10,506,683 B2
(45) Date of Patent: Dec. 10, 2019

(54) ACTIVE POWER DISTRIBUTION SYSTEM FOR LOW-VOLTAGE LIGHTING AND OTHER APPLICATIONS

(71) Applicant: Donald L. Wray, Ocala, FL (US)

(72) Inventor: Donald L. Wray, Ocala, FL (US)

(73) Assignee: USAI, LLC, New Windsor, NY (US)

( * ) Notice: Subject to any disclaimer, the term of this patent is extended or adjusted under 35 U.S.C. 154(b) by 0 days.

(21) Appl. No.: 16/003,993

(22) Filed: Jun. 8, 2018

(65) Prior Publication Data

US 2018/0359833 A1 Dec. 13, 2018

Related U.S. Application Data

(60) Provisional application No. 62/516,952, filed on Jun. 8, 2017.

(51) Int. Cl.
*H05B 33/08* (2006.01)
*H05B 37/02* (2006.01)

(52) U.S. Cl.
CPC ..... *H05B 33/0884* (2013.01); *H05B 33/0887* (2013.01); *H05B 37/0254* (2013.01); *H05B 33/0815* (2013.01)

(58) Field of Classification Search
CPC ............ H05B 33/0815; H05B 33/0818; H05B 33/0884; H05B 33/0809; H05B 33/0848; H05B 33/0857; H05B 33/0887
See application file for complete search history.

(56) References Cited

U.S. PATENT DOCUMENTS

| | | | |
|---|---|---|---|
| 2007/0145915 A1* | 6/2007 | Roberge | F21K 9/00 315/312 |
| 2011/0012661 A1* | 1/2011 | Binder | A63F 9/24 327/276 |
| 2011/0109228 A1* | 5/2011 | Shimomura | H05B 37/0245 315/113 |
| 2014/0159585 A1* | 6/2014 | Reed | H05B 33/0815 315/130 |
| 2014/0300274 A1* | 10/2014 | Acatrinei | H05B 33/0815 315/85 |
| 2015/0237700 A1* | 8/2015 | Woytowitz | H05B 33/0863 315/307 |
| 2017/0133842 A1* | 5/2017 | Freeman | H02J 1/00 |
| 2017/0188420 A1* | 6/2017 | Kido | H04B 10/116 |

* cited by examiner

*Primary Examiner* — Douglas W Owens
*Assistant Examiner* — Syed M Kaiser
(74) *Attorney, Agent, or Firm* — St. Onge Steward Johnston & Reens LLC

(57) ABSTRACT

A lighting control system for use with LED light fixtures that facilitates precise current overload control to achieve transmission of a maximum amount of power across the low-voltage class II cable. The system using an active power control circuit to limit the power transmitted via the low-voltage cable. The system providing under voltage lockout, programmable soft starting, true short circuit protection, overvoltage shutdown and full dimming with the light fixtures being synchronized with no startup delay.

22 Claims, 11 Drawing Sheets

ACTIVE POWER DISTRIBUTION SYSTEM FOR LOW-VOLTAGE LIGHTING AND OTHER APPLICATIONS

FIELD OF THE INVENTION

The system relates to an active power distribution system suitable for LED lighting and other applications, and in particular, to an active power distribution system for LED lighting application utilizing low voltage wiring for providing power and control to LED light fixtures.

BACKGROUND OF THE INVENTION

LED lighting has seen increasing use in the past few years. Some of the advantages of LED lighting include much reduced power consumption compared to incandescent or even fluorescent lighting, long life of the LED fixtures, precise control, numerous variations in the color of the light emitted by LED fixtures, and reduced size and weight of the fixtures allowing for greater use in various applications.

Traditional lighting (for example incandescent or fluorescent) uses relatively high voltage AC power, for example, either 120V or 277V AC. Likewise, LED light fixtures may also utilize high voltage AC power, but this "high" voltage is converted to a relatively "low" DC voltage (12-36V DC) to power the LEDs within the fixtures. To generate this DC voltage, it is typical to provide a voltage converter (a step down transformer) within each LED fixture that converts 120V AC into 12-36V DC. However, this configuration undesirably requires the installation AC wiring that meets the electrical code requirements for distribution of 120V AC power to each LED fixture. This makes installation a rather time and labor intensive and must be performed by licensed and qualified personnel. This configuration also requires the use of a converter in each fixture, which is highly inefficient as each converter will waste a large amount of power in heat dissipation.

Some power distribution systems have envisioned using low voltage wiring as opposed to using standard 120V AC power. For example, in the field of computers and telecommunications, Cisco has provided a system that is called Power Over Ethernet (PoE). PoE describes a system which passes both electrical power and data on conductors in a twisted pair Ethernet cable. This allows for a twisted pair cable to provide both electrical power and data to a device. The advantage of this type of system is that it eliminates the higher voltage wiring but instead, uses only class II low voltage wiring for 48V DC. This means that the installation of the wiring does not have to be performed by licensed individuals. Nor does the wiring have to be installed and secured in a highly regulated manner as the fire hazard of class II wiring distributing lower voltage is negligible.

However, a major disadvantage of the PoE system is the lack of precise control of the power distributed over the low voltage wiring. Furthermore, while for computer applications it may be desirable to provide power and data over the same conductors, this configuration limits the amount of power that can be transmitted over the wires and constrains the ability to control power transmitted over such wires. This is true even for Cisco's "new" system Universal Power over Ethernet (UPoE). Therefore, there are severe limitations on the versatility and efficiency of the system as used for both power distribution and data transfer.

Other known systems use passive "polyswitch" MOV devices to regulate power. These passive systems employ varistors, however, these devices do not provide precise control of power and therefore severely limit the amount of power that can effectively be transmitted over the conductors.

It is contemplated that an active power distribution system (as opposed to passive type systems) for controlling over current and voltage would facilitate providing a highly controllable and precise amount of power to be transmitted over low voltage cables. This active type system would allow for the precise setting and control of fault detection and cable protection.

SUMMARY OF THE INVENTION

What is desired then is an active power distribution system suitable for LED lighting systems and other applications that uses a low-voltage distribution scheme where both power and data is transmitted to the LED fixtures.

It is still further desired to provide an LED lighting system where low power and data is transmitted to the LED fixtures via a daisy chain connection with standard CAT 6 cabling.

It is also desired to provide an LED lighting system where low voltage power and data is transmitted to the LED fixtures via standard CAT 6 cabling where the maximum safe level of current can be transmitted across the CAT 6 cabling.

These and other objects are achieved by the provision of an active power distribution system that utilizes standard CAT 6 cabling to transmit both power and data to LED fixtures in a daisy chain configuration.

For this application the following terms and definitions shall apply:

The term "data" as used herein means any indicia, signals, marks, symbols, domains, symbol sets, representations, and any other physical form or forms representing information, whether permanent or temporary, whether visible, audible, acoustic, electric, magnetic, electromagnetic or otherwise manifested. The term "data" as used to represent predetermined information in one physical form shall be deemed to encompass any and all representations of the same predetermined information in a different physical form or forms.

The term "network" as used herein includes both networks and internetworks of all kinds, including the Internet, and is not limited to any particular network or inter-network.

The terms "first" and "second" are used to distinguish one element, set, data, object or thing from another, and are not used to designate relative position or arrangement in time.

The terms "coupled", "coupled to", "coupled with", "connected", "connected to", and "connected with" as used herein each mean a relationship between or among two or more devices, apparatus, files, programs, applications, media, components, networks, systems, subsystems, and/or means, constituting any one or more of (a) a connection, whether direct or through one or more other devices, apparatus, files, programs, applications, media, components, networks, systems, subsystems, or means, (b) a communications relationship, whether direct or through one or more other devices, apparatus, files, programs, applications, media, components, networks, systems, subsystems, or means, and/or (c) a functional relationship in which the operation of any one or more devices, apparatus, files, programs, applications, media, components, networks, systems, subsystems, or means depends, in whole or in part, on the operation of any one or more others thereof.

In one configuration a lighting system is provided comprising a digital power module including a DC power supply adapted to be connected to a source of AC power, the DC power supply generating a DC power output, a power control circuit having an input coupled to the DC power output, the power control circuit including a power limit chip and generating a lighting power output and a lighting control circuit generating a lighting control output. The system is provided such that the power control circuit has a power threshold and if the lighting power threshold is exceeded, the lighting power output is cycled based on the selected power threshold. The system further comprises a fixture control module adapted to receive the lighting power output and the lighting control output and an LED fixture coupled to the fixture control module and adapted to receive an output signal from the fixture control module.

In another configuration a method of controlling an LED lighting system is provided comprising the steps of receiving AC power from a power source, converting the AC power to DC power and providing the DC power to a power control circuit. The method further comprises the steps of setting a power threshold, generating a lighting power output with the power control circuit and generating a lighting control output. The method still further comprises the steps of transmitting the lighting power output and the lighting control output to a fixture control module, transmitting the lighting power output and the lighting control output from the fixture control module to an LED light fixture and cycling the power control circuit to maintain the lighting power output at or below the selected power threshold.

Other objects of the invention and its particular features and advantages will become more apparent from consideration of the following drawings and accompanying detailed description.

DETAILED DESCRIPTION OF THE INVENTION

Figure 1:
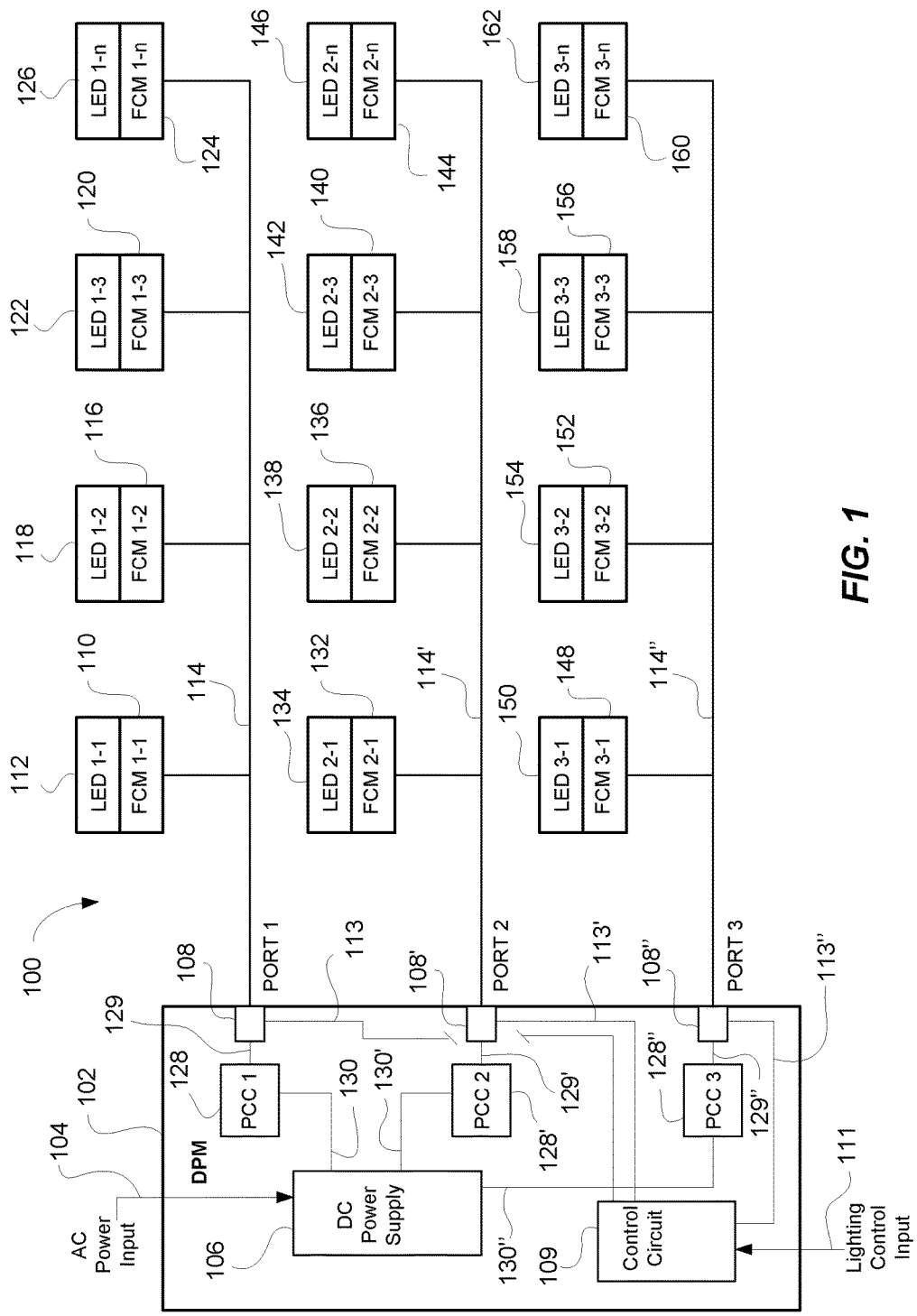
FIG. 1 is a block diagram of an LED lighting system incorporating an active power distribution system according to the invention, including a Digital Power Module having multiple ports and multiple LED light fixtures connected in a daisy chain configuration.

Referring now to the drawings, wherein like reference numerals designate corresponding structure throughout the views.

FIG. 1 is a block diagram of a LED lighting system 100 incorporating an active power distribution system, which includes a Digital Power Module (DPM) 102 having an AC power input 104, a DC power source 106, and multiple ports 108, 108', 108" (in this case three separate ports), with various LED light fixtures connected to each port.

On port 1 108, LED light fixture 1-1 112 is connected to Fixture Control Module (FCM) 1-1 110, which is connected to a low-voltage power cable 114, which could comprise a CAT 6 cable, that is coupled to port 1 108. Also shown connected to port 1 108 is LED light fixture 1-2 118 connected to Fixture Control Module 1-2 116, LED light fixture 1-3 122 connected to Fixture Control Module 1-3 120, and LED light fixture 1-n 126 connected to Fixture Control Module 1-n 124. It is contemplated that a greater number or fewer light fixtures may be connected to cable 114, the limitation being the power consumption of each light fixture.

Figure 2:
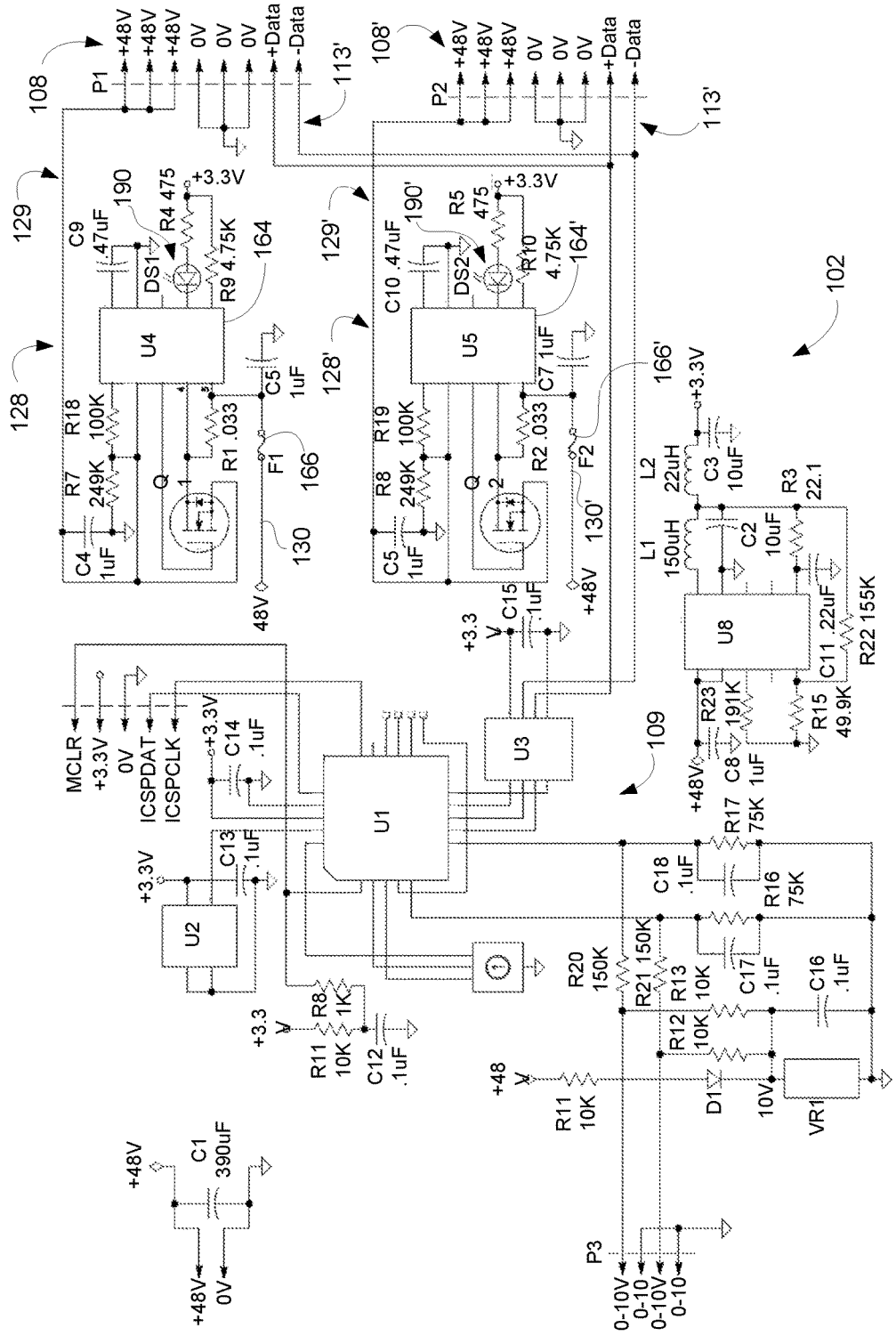
FIG. 2 is a schematic diagram of a Digital Power Module according to FIG. 1.
Figure 3:
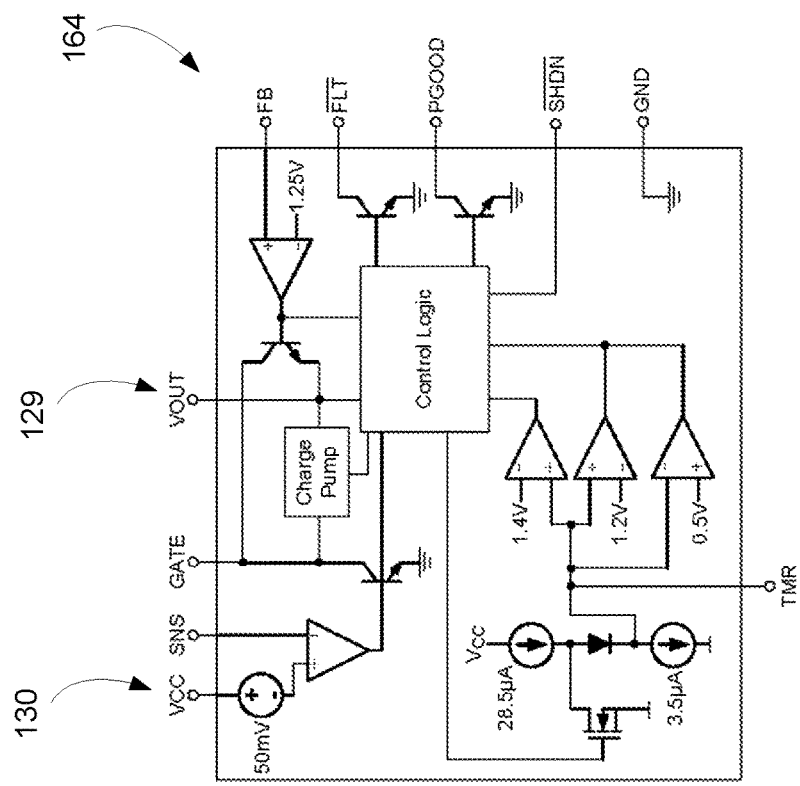
FIG. 3 is a schematic diagram of a power limiting chip as is used in the Digital Power Module according to FIG. 2.

Power Control Circuit 1 (PCC 1) 128 is positioned within DPM 102. PCC 1 128 may comprise any number of circuit configurations. Two such configurations are illustrated in FIGS. 2 and 3. PCC 1 128 includes an input that receives DC power from DC power output 130 of DC power supply 106. PCC 1 128 has a power output 129 that transmits the DC power from PCC1 128 to port 1 108 for connection to cable 114. Each PCC 128, 128', 128" has a corresponding power output 129, 129', 129" to a corresponding port 108, 108', 108".

DPM 102 is also depicted having Port 2 108' and Port 3 108", which are similar to Port 1 108. While three ports are illustrated, it is contemplated that additional or fewer ports could be utilized or provided. PCC 2 128' includes an input that receives DC power from DC power output 130' of DC power supply 106, while PCC 2 128" includes an input that receives DC power from DC power output 130" of DC power supply 106.

A low-voltage power cable 114', which could comprise a CAT 6 cable, that is coupled between port 2 108' and Fixture Control Module 2-1 116. Fixture Control Module 2-1 116 is coupled to LED light fixture 2-1 134. Also connected to cable 114' is Fixture Control Module 2-2 136, which is in turn, connected to LED light fixture 2-2 138 and Fixture Control Module 2-3 140 is connected to cable 114' with LED light fixture 2-3 142 connected to and Fixture Control Module 2-3 140. Finally, Fixture Control Module 2-n 144 is connected to cable 114'. Fixture Control Module 2-n 144 is coupled to LED light fixture 2-n 146.

A low-voltage power cable 114", which could comprise a CAT 6 cable, is coupled between port 3 108" and Fixture Control Module 3-1 148. Fixture Control Module 3-1 148 is coupled to LED light fixture 3-1 150. Also connected to cable 114' is Fixture Control Module 3-2 152, which is in turn, connected to LED light fixture 3-2 154 and Fixture Control Module 3-3 156 is connected to cable 114" with LED light fixture 3-3 158 connected to and Fixture Control Module 3-3 156. Finally, Fixture Control Module 3-n 160 is connected to cable 114". Fixture Control Module 3-n 160 is coupled to LED light fixture 3-n 162.

It should be noted that FIG. 1 depicts the same number of light fixtures for each port. However, it is contemplated that a "balanced" load between ports is not necessary and any number of fixtures may be connected to each port with the only limitation being the total power consumption of the connected fixtures for each port.

As can be seen with reference to FIG. 1, the "high" voltage (e.g., 120/277 V AC) need only be provided to DPM 102 and from that point onward, all the wiring from the DPM 102 to the LED light fixtures comprises or consists of low-voltage class II wiring. This enables the use of, for example, CAT 5, CAT 5E or CAT 6 cabling and the use of RJ45 connectors for the distribution of power and data to all of the connected LED light fixtures. These types of cables and connectors are relatively inexpensive, they are easily terminated in the field, they meet plenum UL rating fire standards such that they can be strung very quickly in a drop ceiling, and are extensively used throughout the data IT wiring industry so that many different individuals are familiar with and are able to install them. This offers a very significant advantage over traditional class I type wiring that requires a licensed professional to install and must conform to strict installations instructions and must be inspected by local authorities for compliance and fire safety.

CAT 6 cables are constructed having a total of eight, 23 gauge (23 AWG) conductors, provided as four twisted pairs in a single external sleeve. It is contemplated that three pairs of conductors may be utilized to transfer power from the Power Control Circuit to the various Fixture Control Modules. In this configuration, the maximum DC power that can be safely transmitted would be calculated as follows, 50V DC×0.6 A×3=90 W. 50 V DC corresponds to the voltage provided by the DC power supply 106. The 0.6 A corresponds to the maximum current that a 23 AWG copper conductor can safely transmit. There are also three sets of conductors for transmitting the electrical power to the various light fixtures for each port.

Also shown in FIG. 1 is control circuit(ry) 109, that receives a lighting control input 111. The lighting control input 111 can be take the form of any control signal whether from a locally mounted device (wall mounted interface, ceiling mounted sensor, etc.), or a signal from a lighting network control system, or a program that is stored locally or remotely, or any other type of control signal/system. The control circuit 109 can transfer and/or process the received lighting control input and transmit data via data connections 113, 113', 113" to ports 108, 108', 108" for transmission to the respective LED light fixtures.

Data transfer from DPM 102 to the individual FCMs is accomplished by using the final remaining pair of wires of cable 114, 114', 114". That pair of wires could be used as a half-duplex or full-duplex RS-485 communication link running a standard lighting communication protocol such as, for example, DMX, Lutron, or DALI, or another suitable protocol. The data is received by the light fixtures and is used to control the fixture including, for example, the color and/or the intensity of the light emitted by the light fixtures. Additionally, it is understood that the individual light fixtures can be addressable such that specific instructions can be sent to specific light fixtures.

It is contemplated that for each port from the DPM 102, cables 114, 114', 114" can be installed in a daisy chain configuration to connect to a number of LED light fixtures fed from that port. The number of LED light fixtures will vary depending on the power consumption of each connected fixture.

In order to maximize and precisely control the amount of current that is transmitted over the three pairs of conductors, PCC 1 128 (as well as PCC 2, 128', PCC 3 128") is provided as an "active" power control circuit. This term ("active") is used to differentiate lighting system 100 from other systems that utilize passive power limiting and control. For example, systems are known that incorporate fuses or trip elements to set a threshold above which the protective device will open to prevent current from exceeding a particular level. These passive type systems however, are not designed to get the most power out of a system, but will set the maximum current level based on a percentage of the maximum current draw a conductor is designed to handled (e.g., typically around 80%). In contrast, the active power control circuit dynamically measures the current usage and allows a current that utilizes essentially the entire current carrying capacity of the class II cabling.

The PCC 128, 128', 128" is provided in DPM 102 and is placed "downstream" of DC power supply 106 between DC power supply 106 and cabling 114, 114', 114" that is connected to a respective port 108, 108', 108". Thus, the PCC 128, 128', 128" is also "upstream" of such cabling 114, 114', 114" and the FCM(s) connected thereto. In some instances, the DPM 102 is provided with a single port, and will therefore include a single PCC feeding that port. In other cases, the DPM 102 will include multiple ports and will therefore include a separate PCC for each port.

Figure 4:
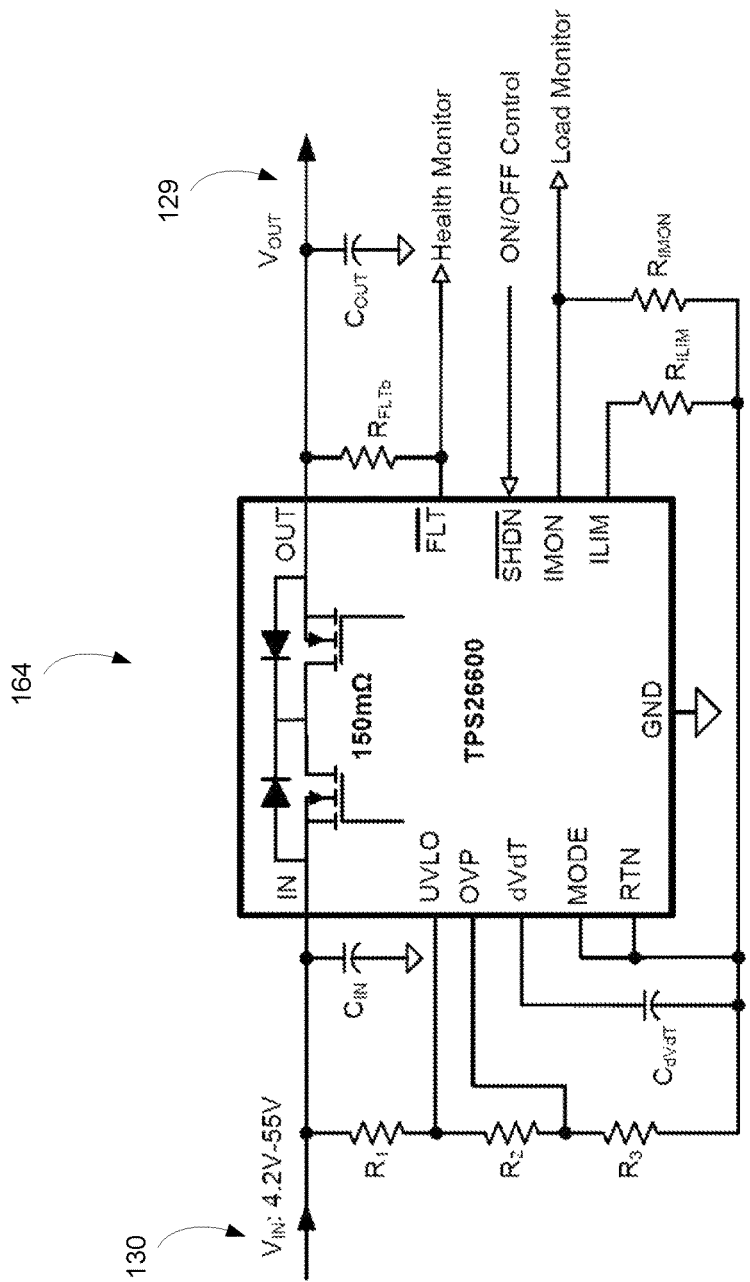
FIG. 4 is a schematic diagram of an alternative power limiting chip as is used in the Digital Power Module according to FIG. 2.

Each Power Control Circuit (PCC) 128, 128', 128" can include a Power Limit Chip (PLC) 164, 164' (FIG. 2) which may comprise a "soft start" chip. One example for the PLC 164, 164' could be a RT1720 manufactured by Richtek (FIG. 3) or alternatively, a TPS2660x 60-V, 2-A Industrial eFuse With Integrated Reverse Input Polarity Protection manufactured by Texas Instruments (FIG. 4), or another suitable chip. The PLC could provide control in the event of any of the following events: an open, a short, an over power situation, and could also provide some regulation if the primary power supply fails and/or if a short develops in the connected LED fixtures or even if a short occurs in the cable itself feeding the LED fixtures. It is contemplated that the functionality of the PCC and/or PLC could also be implemented by discrete analog and/or digital components. Accordingly, invention should not be read as limited by any particular selection of integrated and/or discrete components, but rather it is the novel functionality achieved by the combination of components that are implemented to achieve the result and function of new lighting system 100.

In addition to the power limit chip 164, 164', a fuse 166, 166' may be provided in line with each port, preferably between the DC power supply 106 and the power limit chip 164, 164', to provide protection in the event of a failure of the electronics. The fuses can be single use or multiple use fuses as are known in the industry.

One advantage of providing a PCC 128, 128', 128" on the output of each port 108, 108', 108", is that bulk or redundant power supplies may be connected to each port 108, 108', 108" while still providing the above described protection. Unlike PoE solutions, the configuration described above is a much more robust method that allows maximum start current because the Field Effect Transistor (FET) will exhibit low impedance in a saturated mode, and it provides low Resistance Drain to Source (RDS) unlike Poly switches or Metal Oxide Varistor (MOV)-type devices. As such, this allows the LED light fixtures to function properly even when initially turned on. Likewise, this method also allows for very precise current limits, which in turn, allows for the maximum amount of power to be transmitted across the cables in a safe manner. Increasing the amount of power that can be safely transmitted will increase the number of fixtures that can be connected to a single cable, which reduces the total number of cables needed to be installed thereby reducing installation costs and speeding up installation.

Turning back to FIG. 2, it can be seen that this is one configuration for DPM 102. This configuration allows for 0-10 V controls to be digitized and to drive one or two color white light LED light fixtures. The DPM 102 includes a power limit chip 164, 164' (U4/U5) between the DC power source 106 (+48 V Source) and the ports 108, 108' (P1/P2). As an example, the power output of the power limit chip 164, 164' is connected to three pairs of terminals (1/4, 2/5, and 3/6) of the associated port 108, 108' (P1/P2), while data is transmitted via the fourth pair of terminals (7/8), although other configurations are possible. A fuse 166, 166' (F1/F2, 2.5 A) is provided between the DC power source 106 and the power limit chip 164, 164'.

The power limit chip 164, 164' acts to limit the total amount of power (current and/or voltage) that is able to be transmitted across cable 114, 114' from a respective port 108, 108'. In the event that a maximum threshold of power transmission is reached, the power limit chip 164, 164' is adapted to cycle the power Off/On in a predefined manner. In one configuration, the power limit chip is programed to enter a "hiccup mode", which functions to cycle the output power at, for example, 88/12 (OFF for 88% and ON for 12%). In function, the power limit chip 164, 164' will actively measure the current and adjust to a maximum value that is safe for cable 114, 114'. However, in certain circumstances it is understood that this maximum "safe" threshold could be exceeded for a variety of reasons, such as, a short circuit or ground fault or other type of fault. In those instances where the system is operating outside of the normal operating parameters, the system can be set and/or programmed to cycle Off/On so as not to exceed the threshold. In one configuration, it is contemplated that a line resistance check may be performed, such as by the transmission of a narrow current pulse, such that full current is not applied to the line. This will function to allow the system to continue operating even in this condition while simultaneously preventing the PCC 128, 128' from overheating.

It is contemplated that this Off/On cycle can be programed and adjusted to precisely control delivery of maximum safe power. For example, at pin 10 on the RT1720, the value of a capacitor could be used to set an internal timer such that, when in a fault condition (e.g., over voltage on the input or over current on the output), the internal timer will time out and cycle in a 12%/88% ratio trying to restart (Hiccup) to reset when the fault is removed. The 12/88 ratio is selected, however, the cycle time is set by the timer capacitor. The active control provided by the system will allow for very precise and accurate adjustment of the Off/On cycle to allow for the maximum safe power usage.

Another issue that is distinct to LED light fixtures is the relatively high startup power. This issue, particularly as related to semiconductor light fixtures, is sometimes referred to as "inrush current." Inrush current is a relatively high initial current draw that flows for a short duration into the LED driver, which functions to charge the capacitors on the input side. However, the magnitude of this inrush current is typically much higher than the steady-state operating current for the system. In particular, this situation is caused by the EMC filter on the input and a large capacitance on the boost circuit. To compound this problem, when multiple LED drivers are used in an LED fixture, the inrush current is additive. Still further, if multiple LED fixtures are connected to a single circuit or feed (port), the inrush current for each of the connected LED fixtures is additive as is the duration (time) of the inrush current.

The inrush current on the FCM's is compensated for by the timer setting. This allows for maintaining a constant current (e.g., programmed current of 1.5 A, or 1.7 A, etc.). When the FCMs are initially powering up the LED's, the FCMs are off and the input capacitance is quite low. This means that the timer constant before the "hiccup" mode can start is long enough such that the FCMs will not cause a fault to force the system into "hiccup" mode unless a fault (i.e. short) is actually detected.

The above inrush current problem becomes even more of a challenge for relatively low-voltage power distribution as described in this application. To account for this phenomenon, the power limit chip 164, 164' is programmed to allow or compensate for the inrush current, even if the LED light fixtures comprise multiple drivers in each fixture and there are multiple LED light fixtures on a single port such as is illustrated in FIG. 1.

Another factor to be considered in the design of LED light fixtures is that of relatively high line impedance. Line impedance can have a significant impact on the peak, and the duration of, the inrush current. For example, when 23 AWG wire is used (e.g., CAT 6 cable), the size of the wire, the length of the cable run and the inclusion of any other devices on the port are issues that could lead to a high line impedance. As stated above, during startup each PCC and PLC should provide a stable constant current. The startup being a 48V constant voltage source can handle this current with no overload issues occurring, even with high or low line impedance. The LED switching regulator (commonly a switching "buck" down converter) in the FCMs will not draw any current until the forward voltage (VF) of the LEDs in the LED light fixtures is exceeded. By this time the FCM microprocessor has control of the loads.

Figure 5:
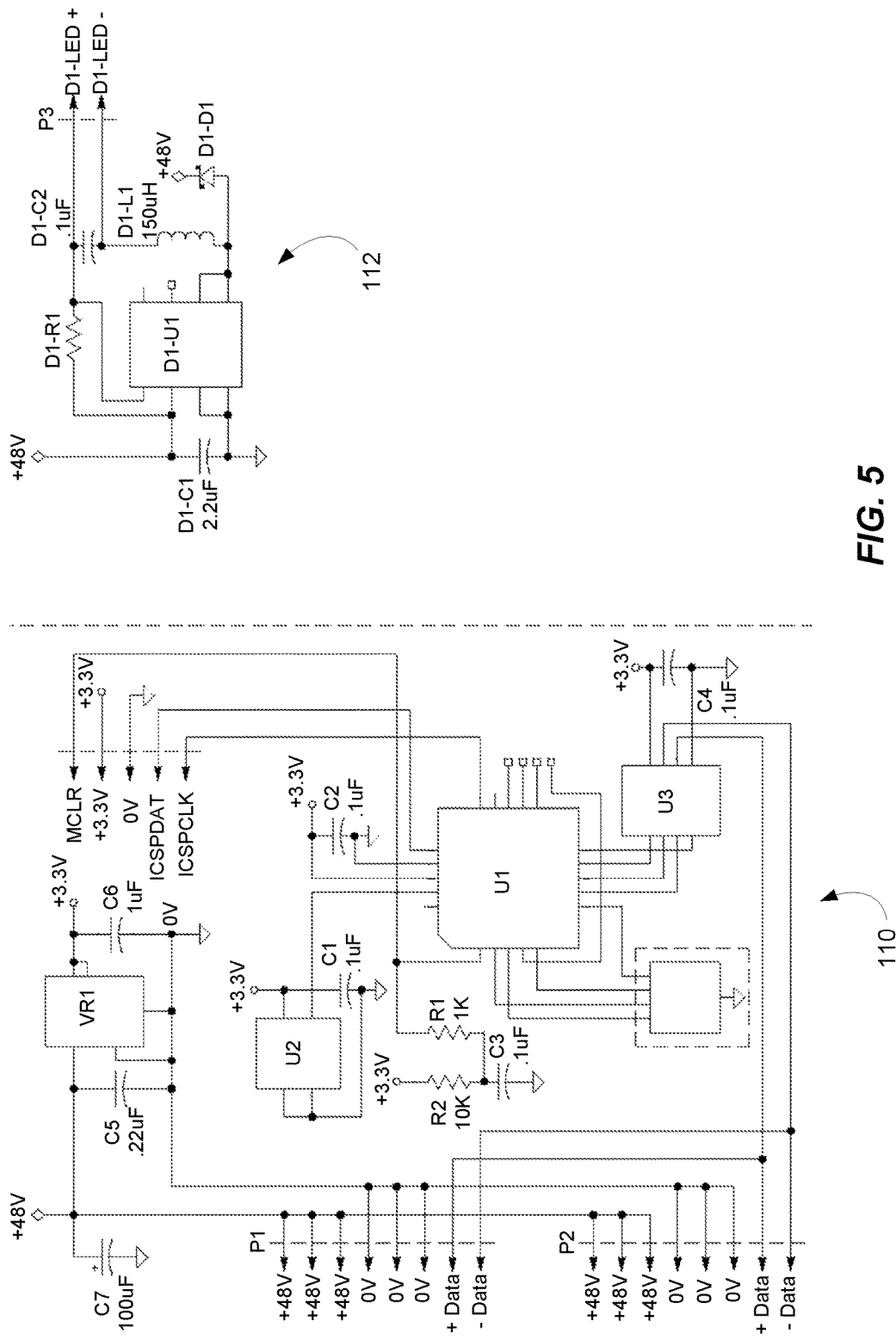
FIG. 5 is a schematic diagram of a single channel Fixture Control Module according to FIG. 2.
Figure 6:
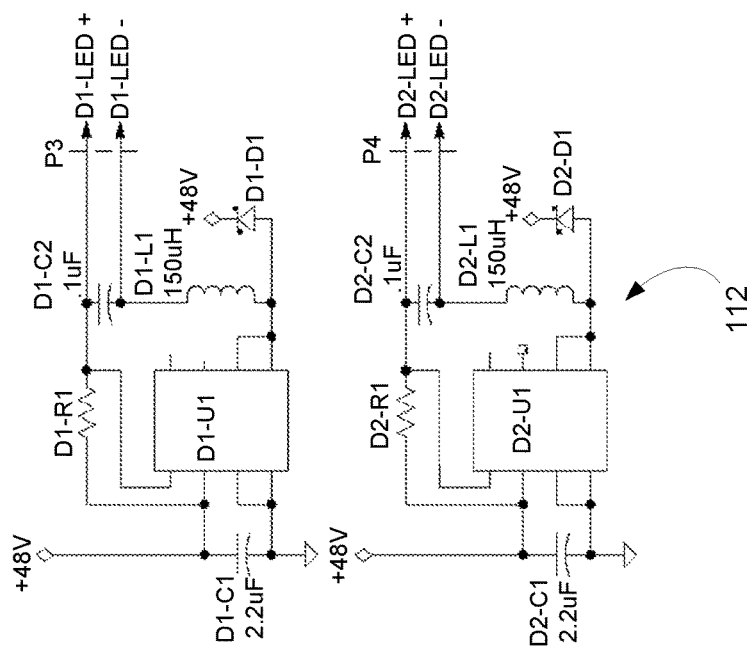
FIG. 6 is a schematic diagram of a two channel Fixture Control Module according to FIG. 2.
Figure 6:
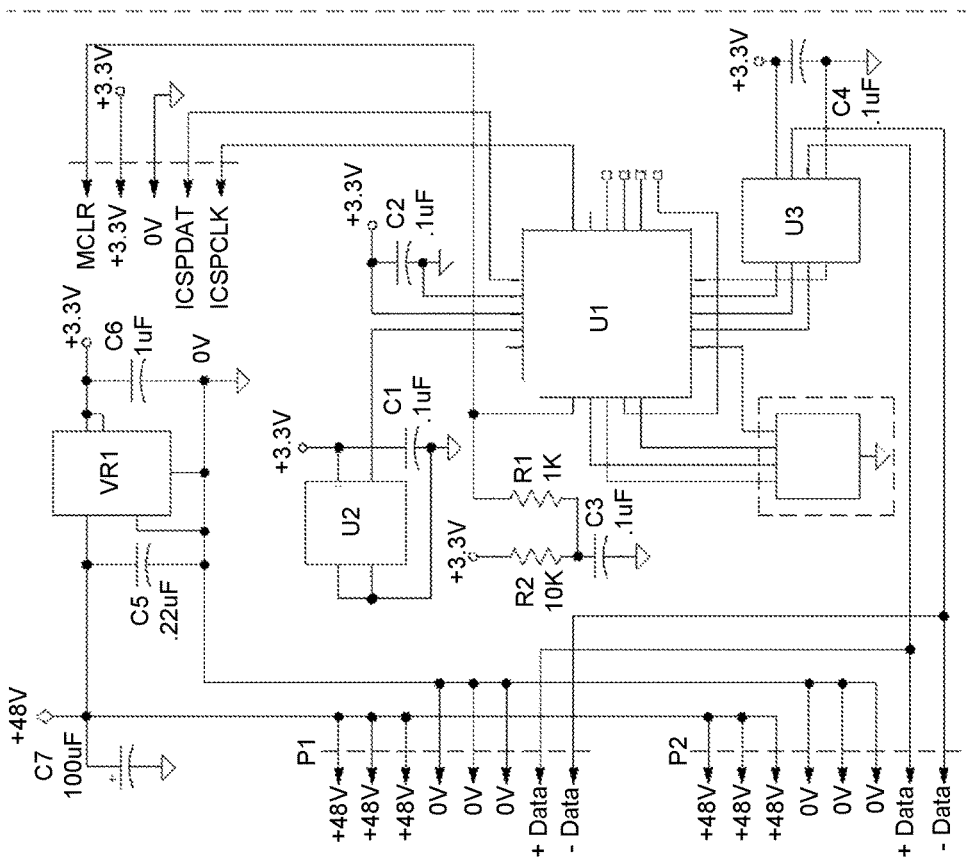

FIGS. 5 and 6 illustrate the various configurations of a Fixture Control Module (FCM) 110 suitable for an LED lighting system incorporating the active power system, including in single channel and two channel configurations. The LED Driver that receives the DC power (+48 V) from the DPM 102 over the cables 114, 114', 114" is shown on the upper right hand side of FIG. 5 and is labeled as D1-U1 LED DRIVER. Likewise, is the LED Drivers are shown for each port in FIG. 6 and are labeled D1-U1 LED DRIVER 1 and D2-U1 LED DRIVER 2 respectively. The power and data terminals of the two ports are interconnected, which allows LED light fixtures to be connected in a daisy-chain configuration to a single port of the Digital Power Module 102.

Figure 7A:
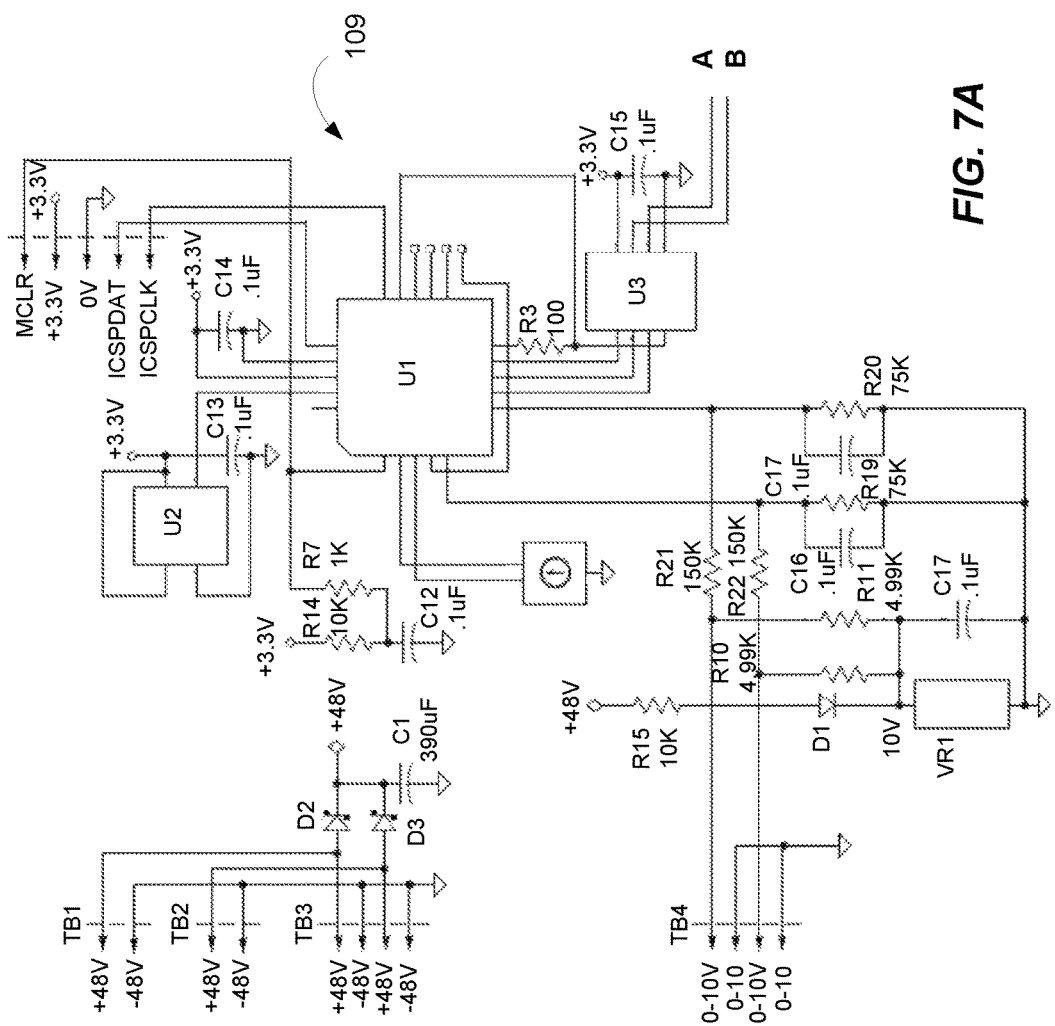
FIG. 7A is a schematic diagram of an alternative design for the Digital Power Module according to FIG. 1.
Figure 7B:
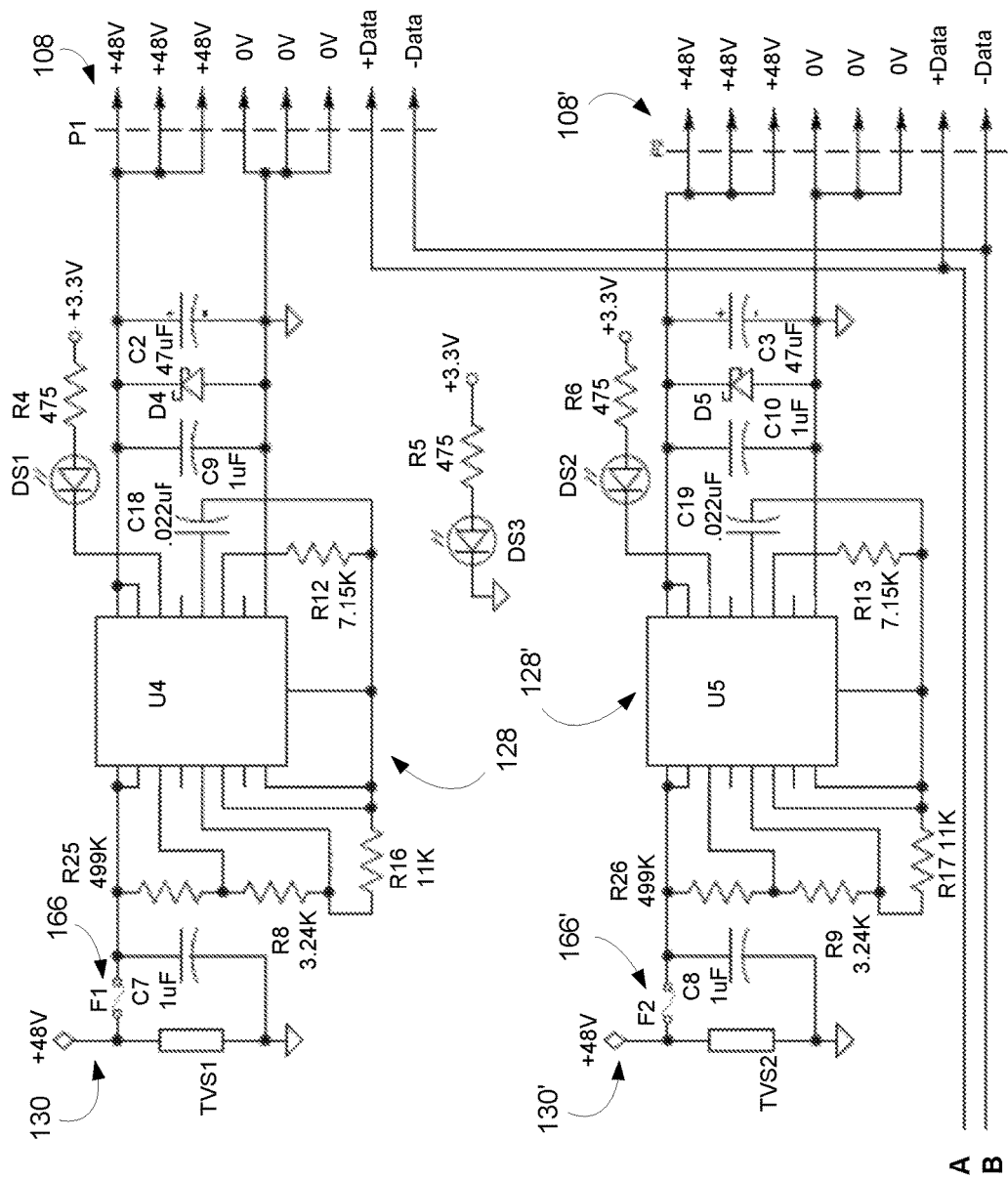
FIG. 7B is a continued schematic diagram of the alternative design for the Digital Power Module according to FIG. 7A.
Figure 7C:
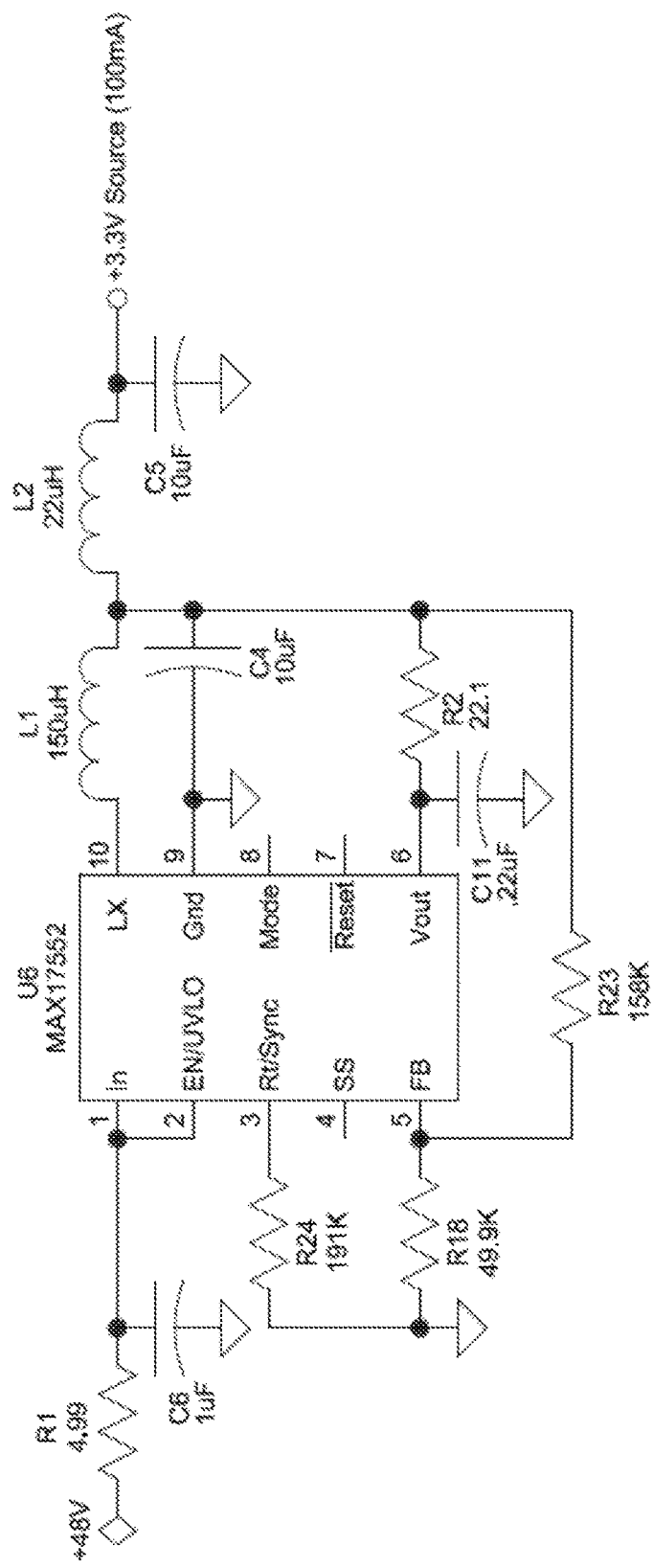
FIG. 7C is a continued schematic diagram of the alternative design for the Digital Power Module according to FIGS. 7A and 7B.

FIGS. 7A-7C illustrate an alternative design for DPM 102 according to FIG. 1. As can be seen, the control circuit(ry) 109 is illustrated in FIG. 7A, while the Power Control Circuits 128, 128' are illustrated in FIG. 7B. A connection is labeled in FIGS. 7A and 7B as "AB", which is provided to illustrate a connection between FIG. 7A and FIG. 7B. FIG. 7C illustrates a portion of DPM that provides a stepped down voltage from 48V DC to 3.3V DC.

Figure 8A:
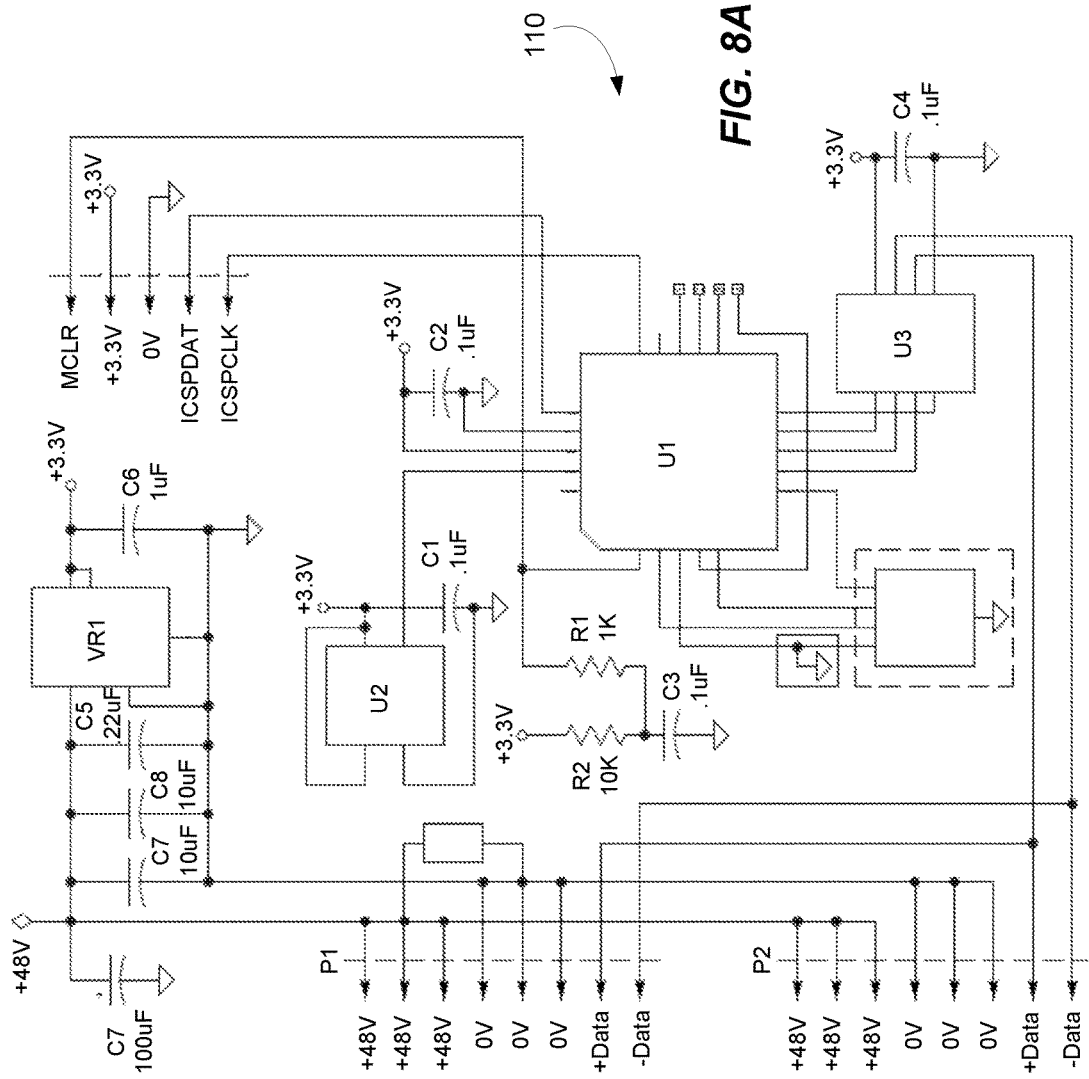
FIG. 8A is a schematic diagram of an alternative design for the Fixture Control Module according to FIG. 1.
Figure 8B:
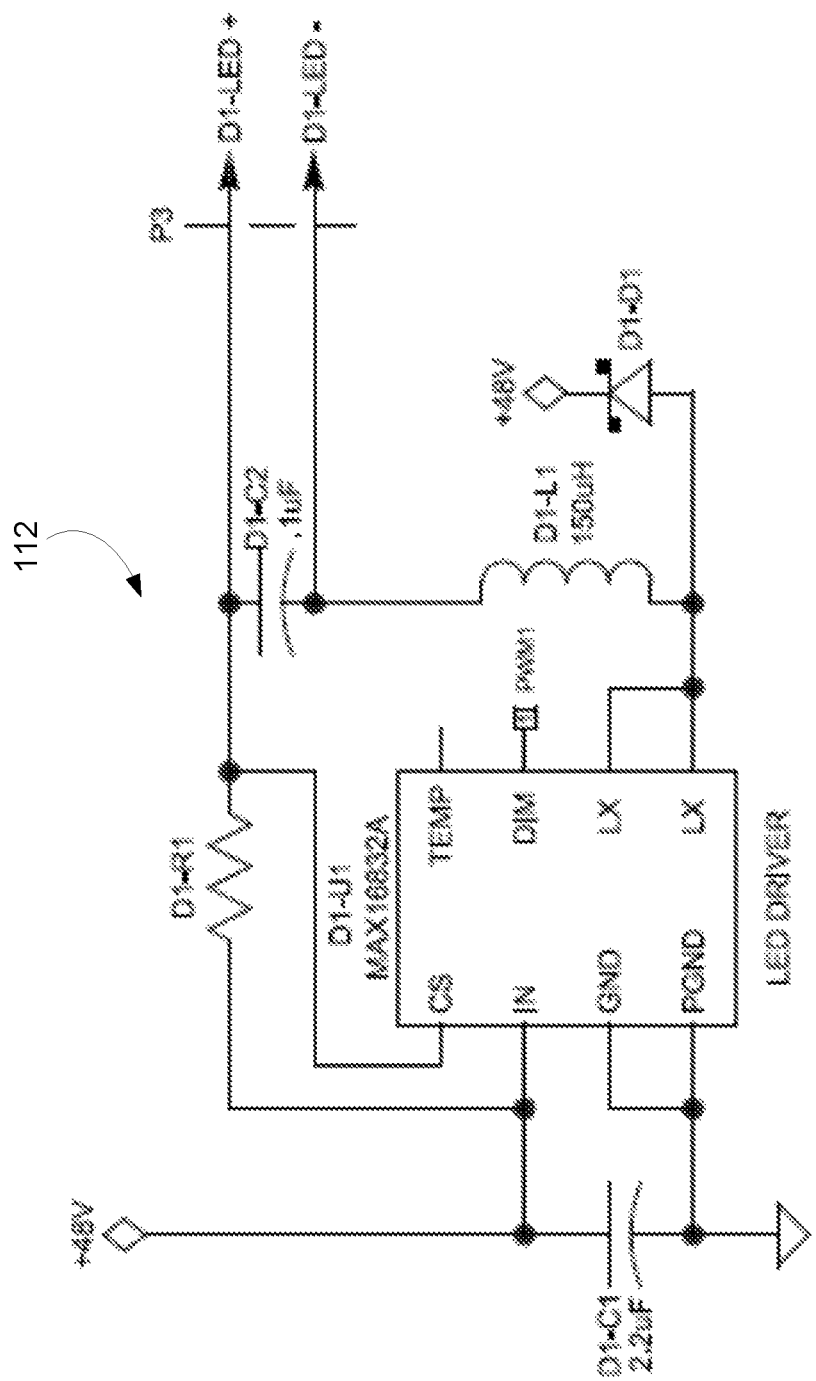
FIG. 8B is a schematic diagram of an LED Driver for use with the Fixture Control Module according to FIG. 8A.

FIGS. 8A-8B illustrate an alternative single channel FCM 102 according to FIG. 1, which is designed to function with the DPM 102 illustrated in FIGS. 7A-7C.

When looking at the present system generally described in FIG. 1 and more specifically disclosed in the other Figures, the benefits of light system 100, employing the Power Control Circuit 128, 128', 128" include:

(1) Precise current overload control that allows transmission of a maximum amount of power across the low-voltage class II cable 114, 114', 114", for example 80 W to 90 W or 100 W, or more. The overcurrent limit can be precisely set (e.g., 1.7 A (82 W)) such that each cable 114, 114', 114" can handle up to, for example, six LED light fixtures.

(2) Under voltage lockout is provided, which functions to maintain the power Off to the low-voltage class II cable 114, 114', 114" (and port 108, 108', 108" in the DPM) until a preprogrammed or preset voltage is available from the DC power supply 106 (e.g., 40V or 41V DC), such that the connected LED light fixtures will not overload the DC power supply 106 upon turn on, or a power interruption on the incoming AC power input 104.

(3) Programmable soft start (dv/dt) control of power provided over the low-voltage class II cable 114, 114', 114", which functions to prevent relatively large inductive transients induced by long runs of the cable and also reduces the burden of startup on the fixture loads.

(4) True short circuit protection on the power output 129, 129', 129" (48V) to the LED light fixtures with an externally-visible fault indication LED 190, 190' (FIG. 2) in the DPM 102, which is activated during a fault condition. This functionality prevents a directly shorted cable 114, 114', 114", for example, in the run from the DPM 102 to the FCM 110 from damaging the DPM 102 and visually indicates a fault. It is contemplated that a fault signal could further be transmitted via a network connection to a remote location.

(5) Overvoltage shutdown is provided, which will function to shut off the power provided over the low-voltage class II cable 114, 114', 114" and to the LED light fixtures, in the event that the power supplied to the PCC and PLC by the DC power supply 106 is out of range (e.g., greater than 51 or 52V or another specified threshold value).

(6) Multiple LED light fixtures may effectively be used per low-voltage class II cable 114, 114', 114". For example, up to six (6) LED light fixtures per port/line, rated at for example, 12 W, 10.5 W or 10 W, which would functionally allow for up to twelve (12) LED light fixtures for a DPM 102 having two ports.

(7) The configuration would allow for hot swapping/installation of LED light fixtures on a powered low-voltage class II cable 114, 114', 114" without any adverse effects to the DPM 102.

(8) The system 100 accounts for relatively "long" cable runs of, for example, 250 feet, with a voltage drop of about 2V at the last fixture on the cable.

(9) Finally, all of the LED light fixtures connected to the DPM 102 are capable of being dimmed from full off or 0.1% dimming level to full on. Likewise, all of the LED light fixtures are synchronized because the system 100 is digital and does not have any startup delay.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A lighting system comprising:
   a digital power module including:
      a DC power supply adapted to be connected to a source of AC power, said DC power supply generating a DC power output;
      a first active power control circuit having an input coupled to the DC power output, said first active power control circuit including a power limit chip generating and controlling a first lighting power output; and
      a lighting control circuit generating a lighting control output;
   said first active power control circuit has a selected power threshold such that if the lighting power threshold is exceeded, the first lighting power output is cycled based on the selected power threshold;
   a first fixture control module adapted to receive the first lighting power output and the lighting control output;
   an LED fixture coupled to said first fixture control module and adapted to receive an output signal from said first fixture control module;
   a second active power control circuit coupled to said DC power source and having a second lighting power output;
   wherein the second lighting power output is cycled on and off based on the selected power threshold;
   a second fixture control module adapted to receive the second lighting power output and the lighting control output;
   an LED fixture coupled to said second fixture control module and adapted to receive an output signal from said second fixture control module.

2. The lighting system according to claim 1 wherein said power limit chip is programmable to set the selected power threshold.

3. The lighting system according to claim 1 further comprising a capacitor coupled to an input of the power limit chip.

4. The lighting system according to claim 1 wherein said power limit chip is adapted to cycle the lighting power output of the power control circuit Off/On based on a predetermined ratio.

5. The lighting system according to claim 1 further comprising a Field Effect Transistor (FET) having a Base, a Drain and a Source, wherein said FET exhibits an resistance from the Drain to the Source, said FET coupled to said power limit chip providing a reduced resistance from the Drain to the Source when in a saturated mode;
   wherein in the event of a short circuit or over power situation, said power limit chip functions to limit the power transmitted via the lighting power output.

6. The lighting system according to claim 1 wherein said digital power module is coupled to said fixture control module by a cable selected from the group consisting of: a CAT 5 cable, a CAT 5E cable or a CAT 6 cable.

7. The lighting system according to claim 6 wherein the lighting power output is transmitted on three pairs of conductors and the lighting control output is transmitted on one pair of conductors.

8. The lighting system according to claim 7 wherein the lighting control output uses a half-duplex RS-485 communication link and has a protocol selected from the group consisting of: DMX, Lutron, DALI and combinations thereof.

9. The lighting system according to claim 1 further comprising a fuse coupled between the DC power source and the power control circuit.

10. The lighting system according to claim 1 further comprising:
    a third active power control circuit coupled to said DC power source and having a third lighting power output;
    wherein the third lighting power output is cycled on and off based on the selected power threshold;
    a third fixture control module adapted to receive the third lighting power output and the lighting control output;
    an LED fixture coupled to said third fixture control module and adapted to receive an output signal from said third fixture control module.

11. The lighting system according to claim 9 wherein,
    said first lighting power output of said digital power module is coupled to said first fixture control module via class II cabling and said first active power control circuit dynamically measures the current of said first lighting power output; and
    said second lighting power output of said digital power module is coupled to said second fixture control module via class II cabling and said second active power control circuit dynamically measures the current of said second lighting power output.

12. The lighting system according to claim 11 wherein, current on said first lighting power output is controlled such that an entire current carrying capacity of the class II cabling connected to said first lighting power output may be utilized; and
current on said second lighting power output is controlled such that an entire current carrying capacity of the class II cabling connected to said second lighting power output may be utilized.

13. A lighting system comprising:
a digital power module including:
a DC power supply adapted to be connected to a source of AC power, said DC power supply generating a DC power output;
an active power control circuit having an input coupled to the DC power output, said active power control circuit including a power limit chip generating and controlling a lighting power output; and
a lighting control circuit generating a lighting control output;
said active power control circuit has a selected power threshold such that if the lighting power threshold is exceeded, the lighting power output is cycled based on the selected power threshold;
a fixture control module adapted to receive the lighting power output and the lighting control output; and
an LED fixture coupled to said fixture control module and adapted to receive an output signal from said fixture control module;
wherein if the lighting power threshold is exceeded said power control circuit performs a line resistance measurement and transmits a pulse signal adapted to be transmitted to said fixture control module.

14. The lighting system according to claim 13 wherein the pulse signal comprises a current that is smaller than a current of the lighting power output.

15. A lighting system comprising:
a digital power module including:
a DC power supply adapted to be connected to a source of AC power, said DC power supply generating a DC power output;
an active power control circuit having an input coupled to the DC power output, said active power control circuit including a power limit chip generating and controlling a lighting power output; and
a lighting control circuit generating a lighting control output;
said active power control circuit has a selected power threshold such that if the lighting power threshold is exceeded, the lighting power output is cycled based on the selected power threshold;
a first fixture control module adapted to receive the lighting power output and the lighting control output;
an LED fixture coupled to said first fixture control module and adapted to receive an output signal from said first fixture control module;
a second fixture control module adapted to receive the lighting power output and the lighting control output;
an LED fixture coupled to said second fixture control module and adapted to receive an output signal from said second fixture control module;
a third fixture control module adapted to receive the lighting power output and the lighting control output; and
an LED fixture coupled to said third fixture control module and adapted to receive an output signal from said third fixture control module.

16. A method of controlling an LED lighting system comprising the steps of:
receiving AC power from a power source;
converting the AC power to DC power;
providing the DC power to an active power control circuit;
setting a power threshold;
generating and controlling a lighting power output with the active power control circuit;
generating a lighting control output;
transmitting the lighting power output and the lighting control output to a first fixture control module;
transmitting the lighting power output and the lighting control output from the first fixture control module to a first LED light fixture; and
cycling the power control circuit to maintain the lighting power output at or below the power threshold;
transmitting the lighting power output and the lighting control output to a second fixture control module;
transmitting the lighting power output and the lighting control output from the second fixture control module to a second LED light fixture;
transmitting the lighting power output and the lighting control output to a third fixture control module;
transmitting the lighting power output and the lighting control output from the third fixture control module to a third LED light fixture;
synchronously dimming the first, second and third LED light fixtures with the lighting control output;
wherein the first, second and third LED light fixtures are smoothly dimmable in a range from about 0.1% to 100%.

17. The method according to claim 16 wherein the lighting power threshold is selected to be 82 W.

18. The method according to claim 16 further comprising the steps of:
selecting a voltage level of the DC power; and
maintaining the lighting control output in an Off condition until the DC power reaches the voltage level.

19. The method according to claim 16 further comprising the steps of:
selecting a voltage level of the DC power; and
turning Off the lighting control output if the DC power exceeds the voltage level.

20. The method according to claim 16 wherein the step of cycling the power control circuit to maintain the lighting power output at or below the selected power threshold further comprises cycling according to a predetermined Off/On ratio.

21. A lighting system comprising:
a digital power module including:
a DC power supply adapted to be connected to a source of AC power, said DC power supply generating a DC power output;
an active power control circuit having an input coupled to the DC power output, said active power control circuit including a power limit chip generating and controlling a lighting power output; and
a lighting control circuit generating a lighting control output;
said active power control circuit has a selected power threshold such that if the lighting power threshold is exceeded, the lighting power output is cycled based on the selected power threshold;

a fixture control module adapted to receive the lighting power output and the lighting control output; and an LED fixture coupled to said fixture control module and adapted to receive an output signal from said fixture control module;

wherein said lighting power output of said digital power module is coupled to said fixture control module via class II cabling and said active power control circuit dynamically measures the current of said lighting power output.

22. The lighting system according to claim 21 wherein current on said lighting power output is controlled such that an entire current carrying capacity of the class II cabling may be utilized.

\* \* \* \* \*